Aug. 24, 1954  E. M. DORIN  2,687,080
SPIT FOR ROASTING
Filed Jan. 30, 1952
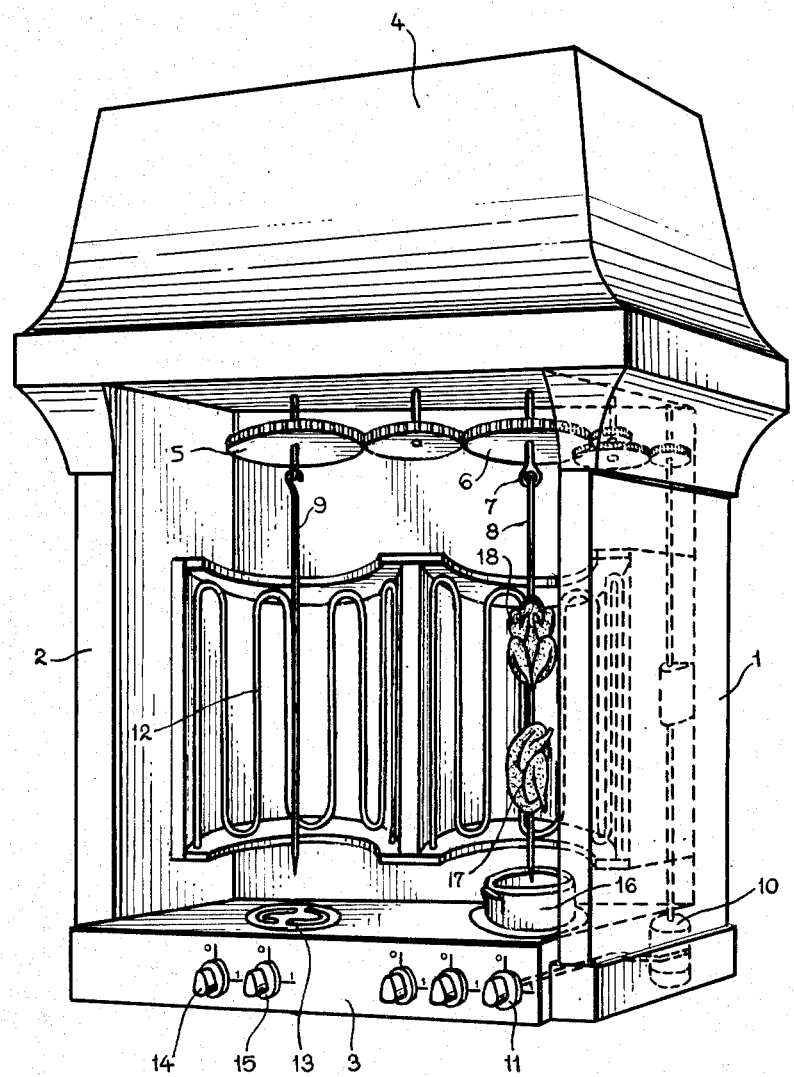
INVENTOR:
ETIENNE, MARCEL DORIN

Patented Aug. 24, 1954

2,687,080

UNITED STATES PATENT OFFICE 2,687,080

SPIT FOR ROASTING

Etienne Marcel Dorin, Paris, France

Application January 30, 1952, Serial No. 268,990

Claims priority, application France
January 31, 1951

2 Claims. (Cl. 99—339)

The present invention relates to a roasting device and, more particularly, a roasting device intended for roasting foods of various types and flavors, such as fowl, fish, meat and the like, and simultaneously preparing dressings from the juices exuded from the heated roast.

Roasting devices are known in which roasting pieces are placed on vertical or horizontal spits and roasted by means of either a wood fire partly surrounding the spit or a gas fire, or by means of electric heating elements, the juice of the roasted pieces collecting in a drip pan placed under the spit and being used to baste said roasting pieces.

The present invention relates to improvements in such roasting devices, and has as its object the provision of a device allowing simultaneous preparation of a roast and a dressing made from the juices exuded by the roast during the roasting process.

Another object of the invention is to provide a device enabling the preparation of dressings having enhanced flavor and quality by virtue of the fact that they are made from fresh juices.

A further object of the invention is the provision of a roasting device of the character indicated which is designed and arranged in such a manner as to effect roasting of skewered roasting pieces and, simultaneously, the preparation of dressings made from the juices exuded from the roast.

The foregoing object is achieved by providing vertical rotatable spits on which the pieces to be roasted may be skewered, and wherein the roasting is carried out through the agency of primary heating means extending substantially along a vertical heating surface partly surrounding each spit and being preferably concave so that heat may be concentrated or focussed on the roast. The simultaneous preparation of dressings made from the juices exuded from the roast is made possible by the provision of independent or auxiliary heating means disposed below each of said spits, and having a substantially horizontally extending heating surface adapted to retain a receptacle or drip pan thereupon; the overall effect of the described arrangement greatly facilitating uniform roasting as a result of passage of heat not only by radiation from the primary heating means, but also by convection from the auxiliary heating means.

In the preferred embodiment of the invention the device comprises a roasting apparatus including a rack of burners set in open air, a revolving spit in front of said rack on which are put the joints to be roasted which thereby directly receive the radiations from the burners, a hot plate disposed under the spit and bearing a vessel intended to receive the juice yielded by the joints for the simultaneous preparation of the dressing. Further, special control means, independent of the heating of the burner rack, are provided to control the heating of the hot plate.

Accordingly, it becomes possible, during the roasting of the joints put on the spit, to cook the dressing with the juice yielded by the joints and to control said cooking in such a way that the dressing shall be ready simultaneously with the roasted joint, the whole dish being set to table without having to reheat the dressing and preventing overcooking it while waiting for the roasted joint to be done to a turn.

In a preferred embodiment, the spits are rotated in any suitable manner, as by means of a fan placed in the chimney of the device and driven by the flow of air or by means of a single motor through a train of gears driven by a worm controlled by the motor or through chain driven pinions, a speed reducer being connected with the motor to reduce the size of the train of gears and to rotate the spits at a speed of about five or six rotations per minute.

By way of example, a preferred embodiment of the invention will be described with particular reference to the accompanying drawing.

The roasting chamber comprises, the uprights or stiles 1, 2, which are disposed on both sides of the base plate 3, and includes in its upper portion immediately below the hood 4, a train of gears rotatably mounted in any appropriate or desired manner. Certain of these gears, such as 5 and 6 in the drawing, are provided with eyes or hooks, such as 7, for rotatably supporting the spits 8 and 9 for the aforesaid joints.

The train of gears is driven by a motor 10 controlled by the switch 11 and said motor is preferably connected with a speed reducer to impart a low rotation speed to the spits 8 and 9.

A suitable source of heat, such as gas racks, wood fire or electric heating elements is designated by reference numeral 12, and is arranged to extend substantially along a vertical heating surface.

The heating elements are preferably mounted on a vertical curved heat concentrating surface 12a, which partly surrounds each spit 8 and 9, and under each spit an auxiliary source of heat is located. This source is, for example, an electric hot plate or the like having a horizontally extending heating surface 13, the switches 14 and 15 controlling said auxiliary heating sources. It is also desirable to place under each spit, as shown for the spit 8, a receptacle or drip pan 16 in order to cook the dressings or sauces intended for use with the roasted pieces 17 and 18 from the juices exuded from said roast pieces.

By way of illustration, two examples are given hereinafter showing the great adaptability and convenience of the apparatus of the present invention for its intended use.

Example 1

String roasted table fowl with new potatoes jumped in butter:

Hang a fowl on your spit over a dish containing some butter placed on a small stove.

The fowl has been previously seasoned with salt and pepper.

As soon as the butter starts changing colour, throw the potatoes in it and control the heating of the stove in such a way that the potatoes will brown but not burn. They must be turned over every now and then and the fowl is to be constantly basted.

According to the size of the fowl, 40 to 50 minutes are necessary for the cooking.

Example 2

A pheasant flanked with quails blazed in liqueur brandy:

Hang the pheasant, well seasoned and barded with bacon, in front of a heated spit: place underneath on the small stove not yet kindled, a dish with some butter.

Roast the pheasant during thirty minutes and baste it all the time.

Kindle the small stove and place in the dish the seasoned quails. You must keep an eye on their roasting, turn them now and then, and in the same time baste the pheasant which is browning and will soon be done to a turn.

Leave the quails during twelve minutes or about, then baste them with a glass of very good liqueur brandy and blaze said brandy.

Set on with sippets fried in butter and coated with the crushed liver of the pheasant.

Send in same time a few very warm chips.

By employing the apparatus of the present invention dressings are prepared simultaneously with joints of meat, pheasant and the like, by using the juice which is yielded by said joints, and the simultaneous preparation of the dressing with fresh juice assures preparation of dressings of extremely fine quality.

The preparation of such fine dressings is assured in the device of the present invention by providing under each of the spits, an auxiliary source of heat distinct from the main heating source which serves for the cooking of the joints on the spits, the dressing being disposed in open air so as to be accessible at all times without having to interrupt the cooking of the joints and by providing heat-controlling means for the auxiliary source which are distinct from the control means of the main burners which serve to roast the joints on the spits.

Since certain modifications may be made in a device of the present invention without departing from the scope thereof, it is intended that all matter contained in the foregoing description and shown in the accompanying drawing be interpreted merely as illustrative and not in a limiting sense.

Accordingly there has been provided a device for roasting food and simultaneously preparing dressing therefor, comprising a roasting chamber freely accessible to air, spits disposed in said chamber and arranged for rotation about respective substantially vertical axes, primary heating meanes for each of said spits, substantially vertical heat-reflecting means surrounding said spits, said primary heating means being arranged to extend in front of said heat reflecting means, and auxiliary heating means positioned below each of said spits, each auxiliary heating means being provided with a surface for retaining a receptacle thereon to thereby collect juices exuded from a roast when skewered on a respective spit to prepare said dressing therefrom, said auxiliary heating means being adapted to intensify the treatment of said roast from below said spits.

While a preferred embodiment of the invention has been shown and herein described, it will be understood that the same is capable of modification without departure from the general scope and spirit of the invention as defined in the claims.

Having thus described the invention, what is claimed as new and desired to be secured by Letters Patent, is:

1. A device for roasting food and simultaneously preparing dressing therefor, comprising a roaseting chamber freely accessible to air, spits disposed in said chamber and arranged for rotation about respective substantially vertical axes, primary heating means for each of said spits, substantially vertical axes, primary heating means for each of said spits, substantially vertical heat-reflecting means surrounding said spits, said primary heating means being arranged to extend in front of said heat reflecting means, and auxiliary heating means positioned below each of said spits, each auxiliary heating means being provided with a surface for retaining a receptacle thereon to thereby collect juices exuded from a roast when skewered on a respective spit to prepare said dressing therefrom, said auxiliary heating means being adapted to intensify the treatment of said roast from below said spits.

2. A device according to claim 1, said substantially vertical heat reflecting means including a plurality of juxtaposed substantially vertical, concavely-shaped surfaces, said primary heating means being supported adjacent said vertical surfaces, respectively.

References Cited in the file of this patent

UNITED STATES PATENTS

| Number | Name | Date |
|---|---|---|
| 1,594,187 | Adami | July 27, 1926 |
| 1,600,776 | Peron | Sept. 21, 1926 |
| 1,630,644 | Troiel | May 31, 1927 |
| 1,860,577 | Hedge | May 31, 1932 |
| 2,482,601 | Spartalis | Sept. 20, 1949 |

FOREIGN PATENTS

| Number | Country | Date |
|---|---|---|
| 15,656 | Switzerland | Dec. 13, 1897 |
| 427,177 | Great Britain | Apr. 15, 1935 |